(12) United States Patent
Sugimoto (10) Patent No.: US 11,454,182 B2
(45) Date of Patent: Sep. 27, 2022

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 17/453,653

(22) Filed: Nov. 5, 2021

(65) Prior Publication Data
US 2022/0145817 A1 May 12, 2022

(30) Foreign Application Priority Data
Nov. 10, 2020 (JP) .............................. JP2020-187216

(51) Int. Cl.
*F02D 41/02* (2006.01)
*F02D 41/00* (2006.01)
*F02D 41/14* (2006.01)

(52) U.S. Cl.
CPC ....... *F02D 41/025* (2013.01); *F02D 41/0087* (2013.01); *F02D 41/0245* (2013.01); *F02D 41/1454* (2013.01); *F02D 41/1498* (2013.01); *F02D 41/0235* (2013.01)

(58) Field of Classification Search
CPC ...... F02D 41/0087; F02D 17/02; F02D 13/06; F02D 2041/0012; F02D 41/025; F02D 41/0245
USPC .............................. 123/198 db, 198 dc, 198 f
See application file for complete search history.

(56) References Cited

U.S. PATENT DOCUMENTS

| | | | | |
|---|---|---|---|---|
| 5,845,492 A | * | 12/1998 | Isobe | F01N 3/32 60/284 |
| 2006/0218899 A1 | * | 10/2006 | Narita | F02D 17/02 123/481 |
| 2015/0051809 A1 | * | 2/2015 | Glugla | F02D 41/005 123/406.12 |
| 2015/0051816 A1 | * | 2/2015 | Glugla | F02D 41/0087 701/108 |
| 2021/0107451 A1 | * | 4/2021 | Nose | B60W 10/06 |
| 2021/0107452 A1 | * | 4/2021 | Nose | F02D 29/02 |
| 2021/0108582 A1 | * | 4/2021 | Nose | F01N 11/00 |
| 2021/0108584 A1 | * | 4/2021 | Nose | F02D 41/1466 |

FOREIGN PATENT DOCUMENTS

JP 2018162721 A 10/2018

* cited by examiner

*Primary Examiner* — Sizo B Vilakazi
(74) *Attorney, Agent, or Firm* — Hauptman Ham, LLP (57) ABSTRACT

A controller for an internal combustion engine is configured to execute a temperature-increasing process, a misfire detecting process that detects a misfire, a determining process, and a decreasing process. The temperature-increasing process includes increasing a temperature of a catalyst through a partial cylinder fuel cut-off process. The determining process includes determining whether a number of misfires detected by the misfire detecting process in a number of times combustion control has been executed in each of cylinders is greater than or equal to a given value. The decreasing process includes setting an amount of temperature increase in the catalyst to be smaller when the number of misfires is greater than or equal to the given value than when the number of misfires is less than the given value.

6 Claims, 9 Drawing Sheets

CONTROLLER AND CONTROL METHOD FOR INTERNAL COMBUSTION ENGINE

RELATED APPLICATIONS

The present application claims priority of Japanese Application Number 2020-187216 filed on Nov. 10, 2020, the disclosure of which is hereby incorporated by reference herein in its entirety.

BACKGROUND

1. Field

The present disclosure relates to a controller and a control method for an internal combustion engine.

2. Description of Related Art

Japanese Laid-Open Patent Publication No. 2018-162721 discloses an example of a device that executes a temperature-increasing process that increases the temperature of a catalyst that purifies exhaust gas. When a misfire is detected in the device during the execution of the temperature-increasing process, the device changes a threshold value that is used to suspend the temperature-increasing process and suspends the temperature-increasing process at an earlier stage.

The inventor examined deactivating the supply of fuel to one or some of the cylinders and supplying fuel to the remaining cylinders as the temperature-increasing process that increases the temperature of the catalyst when the axial torque of the internal combustion engine is not zero. During the execution of such a temperature-increasing process, the occurrence of a misfire increases the amount of fuel supplied to the catalyst. This potentially causes the temperature of the catalyst to increase excessively.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A controller for an internal combustion engine according to an embodiment is configured to control the internal combustion engine. The internal combustion engine includes an exhaust passage and cylinders. The exhaust passage includes a catalyst that purifies exhaust gas. The controller is configured to execute a temperature-increasing process that increases a temperature of the catalyst by deactivating fuel supply to one or some of the cylinders and supplying fuel to remaining ones of the cylinders other than the one or some of the cylinders, a misfire detecting process that detects a misfire, a determining process that determines whether a number of misfires detected by the misfire detecting process in a number of times combustion control has been executed in each of the cylinders is greater than or equal to a given value, and a decreasing process that decreases an amount of temperature increase in the catalyst when the number of misfires is greater than or equal to the given value as compared with when the number of misfires is less than the given value.

In this configuration, when the number of misfires is greater than or equal to the given value, the amount of temperature increase in the catalyst is decreased by executing the above-described decreasing process. This prevents the temperature of the catalyst from being excessively increased during the occurrence of a misfire.

In the controller, the decreasing process may include a process that suspends the deactivation of the fuel supply to the one or some of the cylinders and starts supplying fuel to the one or some of the cylinders.

In this configuration, the execution of the decreasing process starts supplying fuel to the one or some of the cylinders in which the fuel of supply has been deactivated. This reduces the amount of air in exhaust gas discharged out of that cylinder. Accordingly, even if the amount of unburned fuel supplied to the catalyst is increased by the occurrence of a misfire, the amount of air supplied to the catalyst is reduced. This prevents the temperature of the catalyst from being excessively increased.

In the controller, the decreasing process may adjust an amount of fuel supplied to the one or some of the cylinders where the fuel supply is started such that an air-fuel ratio of air-fuel mixture in the one or some of the cylinders becomes leaner than a stoichiometric air-fuel ratio.

In this configuration, as compared with when the air-fuel ratio of the air-fuel mixture in the one or some of the cylinders in which fuel starts to be supplied, the amount of air in the exhaust gas discharged from the fuel cut-off cylinder becomes larger. Thus, the effect of increasing the temperature of the catalyst is gained to a certain extent. This increases the temperature of the catalyst while preventing the temperature of the catalyst from being excessively increased.

In the controller, the decreasing process may include a process that reduces a number of cylinders in which the fuel supply is deactivated in a specific period when the temperature-increasing process is executed.

In this configuration, the execution of the decreasing process reduces the amount of air supplied to the catalyst in the specific period. This prevents the temperature of the catalyst from being excessively increased.

In the controller, the decreasing process may include a process that reduces amounts of fuel supplied to the remaining ones of the cylinders.

In this configuration, the execution of the decreasing process reduces the amount fuel supplied to the one or some of the cylinders in which the fuel of supply has been executed. This reduces the amount of unburned fuel in exhaust gas discharged out of these cylinders. Accordingly, even if the amount of unburned fuel supplied to the catalyst is increased by the occurrence of a misfire, the amount of unburned fuel supplied to the catalyst is reduced. This prevents the temperature of the catalyst from being excessively increased.

In another aspect, a method for controlling an internal combustion engine is provided. The internal combustion engine includes an exhaust passage and cylinders. The exhaust passage includes a catalyst that purifies exhaust gas. The control method includes increasing a temperature of the catalyst by deactivating fuel supply to one or some of the cylinders and supplying fuel to remaining ones of the cylinders other than the one or some of the cylinders, detecting a misfire, determining whether a number of detected misfires in a number of times combustion control has been executed in each of the cylinders is greater than or equal to a given value, and decreasing an amount of temperature increase in the catalyst when the number of misfires is greater than or equal to the given value as compared with when the number of misfires is less than the given value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A controller 70 for an internal combustion engine 10 according to one embodiment will now be described with reference to the drawings.

Figure 1:
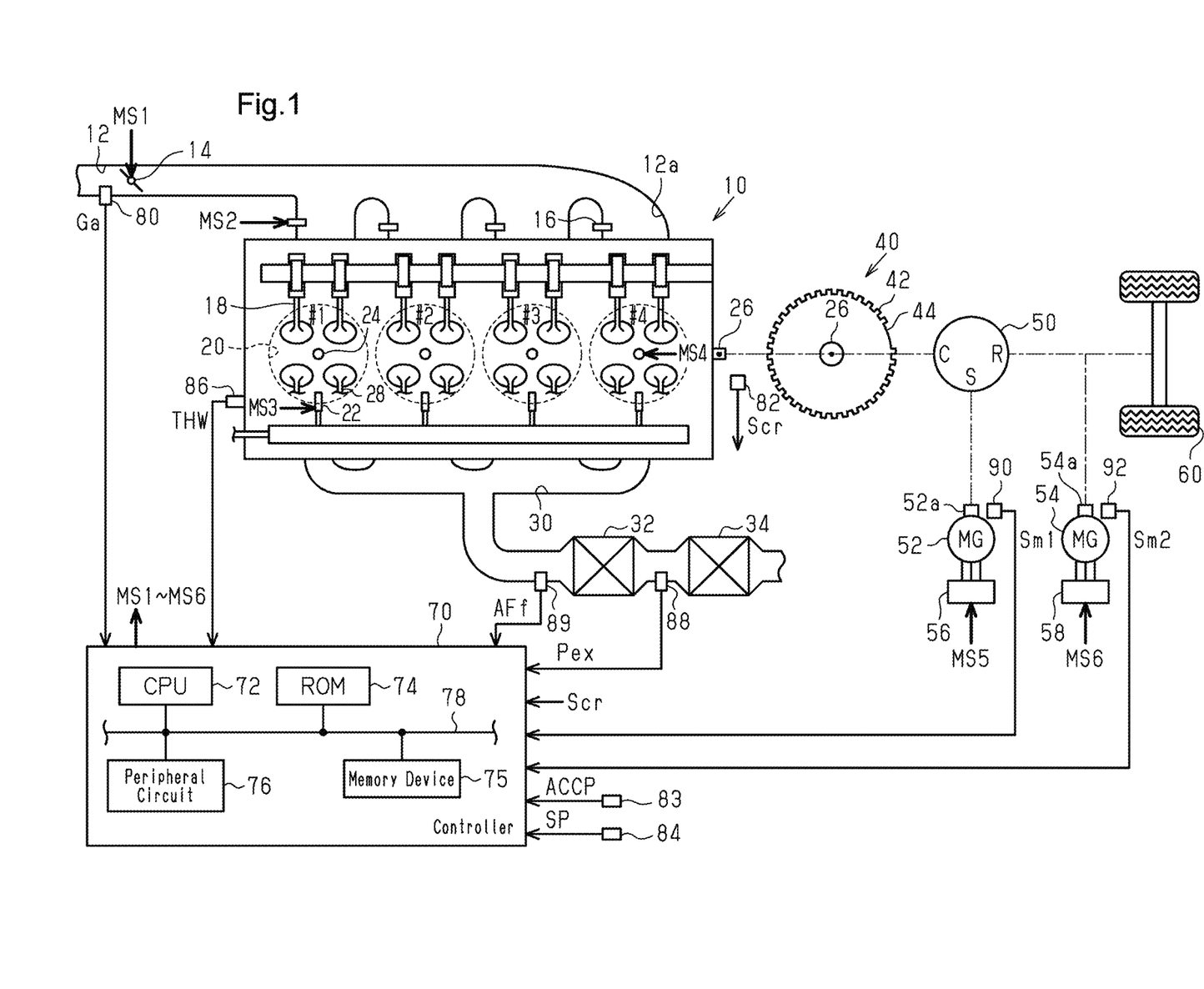
FIG. 1 is a diagram showing the configuration of a driving system and a controller according to a first embodiment.

As shown in FIG. 1, an internal combustion engine 10 includes four cylinders #1 to #4. The internal combustion engine 10 includes an intake passage 12 provided with a throttle valve 14. An intake port 12a at a downstream portion of the intake passage 12 includes port injection valves 16. Each of the port injection valves 16 injects fuel into the intake port 12a. The air drawn into the intake passage 12 and/or the fuel injected from the port injection valves 16 flow into combustion chambers 20 as intake valves 18 open. Fuel is injected into the combustion chambers 20 from direct injection valves 22. The air-fuel mixtures of air and fuel in the combustion chambers 20 are burned by spark discharge of ignition plugs 24. The generated combustion energy is converted into rotation energy of a crankshaft 26.

When exhaust valves 28 open, the air-fuel mixtures burned in the combustion chambers 20 are discharged to an exhaust passage 30 as exhaust gas. The exhaust passage 30 includes a three-way catalyst 32, which has an oxygen storage capacity, and a gasoline particulate filter (GPF) 34. In the GPF 34 of the present embodiment, it is assumed that a three-way catalyst is supported by a filter that traps particulate matter (PM).

A crank rotor 40 with teeth 42 is coupled to the crankshaft 26. The teeth 42 each indicate a rotation angle of the crankshaft 26. While the crank rotor 40 basically includes each tooth 42 at an interval of 10° crank angle (CA), the crank rotor 40 includes an untoothed portion 44. In the untoothed portion 44, the interval between adjacent ones of the teeth 42 is 30° CA. The untoothed portion 44 indicates the reference rotation angle of the crankshaft 26.

The crankshaft 26 is mechanically coupled to a carrier C of a planetary gear mechanism 50, which includes a power split device. A rotary shaft 52a of a first motor generator 52 is mechanically coupled to a sun gear S of the planetary gear mechanism 50. Further, a rotary shaft 54a of a second motor generator 54 and driven wheels 60 are mechanically coupled to a ring gear R of the planetary gear mechanism 50. An inverter 56 applies alternating-current voltage to a terminal of the first motor generator 52. An inverter 58 applies alternating-current voltage to a terminal of the second motor generator 54.

The controller 70 is configured to control the internal combustion engine 10. The controller 70 is configured to operate various operation units of the internal combustion engine 10 such as the throttle valve 14, the port injection valves 16, the direct injection valves 22, and the ignition plugs 24 in order to control controlled variables of the internal combustion engine 10 (for example, torque and exhaust component ratio). For example, the controller 70 calculates a requested torque Tr* for the vehicle using parameters such as an accelerator operation amount ACCP, which is an accelerator operation amount detected by an accelerator sensor 83, and a vehicle speed SP, which is detected by a vehicle speed sensor 84. The controller 70 calculates a requested output Pe* for the internal combustion engine 10 using, for example, the requested torque Tr*. The controller 70 calculates a target rotation speed Ne* and an engine torque command value Te* that allow the requested output Pe* to be efficiently output from the internal combustion engine 10. The controller 70 controls an intake air amount, fuel injection amounts of the port injection valves 16 and the direct injection valves 22, and ignition timings of air-fuel mixture so as to obtain the engine torque command value Te*. To set the fuel injection amounts, the controller 70 executes an increase correction that is based on various requests. The controller 70 controls, for example, a start-time amount increase executed at the start of the internal combustion engine 10, a warm-up amount increase executed at a cold start of the internal combustion engine 10, and a reactivation amount increase executed during reactivation from fuel cut-off.

The controller 70 is configured to control the first motor generator 52. The controller 70 controls the inverter 56 in order to control a rotation speed that is a controlled variable of the first motor generator 52.

Further, the controller 70 is configured to control the second motor generator 54. The controller 70 controls the inverter 58 in order to control a rotation speed that is a controlled variable of the second motor generator 54. FIG. 1 shows operation signals MS1 to MS6 that correspond to the throttle valve 14, the port injection valves 16, the direct injection valves 22, the ignition plugs 24, the inverter 56, and the inverter 58, respectively.

In order to control the controlled variables of the internal combustion engine 10, the controller 70 refers to an intake air amount Ga detected by an air flow meter 80, an output signal Scr of a crank angle sensor 82, and a water temperature THW detected by a water temperature sensor 86. Further, the controller 70 refers to a pressure Pex detected by an exhaust pressure sensor 88 and an air-fuel ratio AFf detected by an air-fuel ratio sensor 89 on the upstream side of the three-way catalyst 32. The pressure Pex is the pressure of exhaust gas flowing into the GPF 34. Additionally, in order to control the controlled variables of the first motor generator 52 and the second motor generator 54, the controller 70 refers to an output signal Sm1 of a first rotation angle sensor 90 and an output signal Sm2 of a second rotation angle sensor 92. The output signal Sm1 is used to detect the rotation angle of the first motor generator 52. The output signal Sm2 is used to detect the rotation angle of the second motor generator 54.

The controller 70 includes a CPU 72 (processor), a ROM 74, a memory device 75, and peripheral circuitry 76. The CPU 72, the ROM 74, the memory device 75, and the peripheral circuitry 76 are capable of communicating with one another via a communication line 78. The peripheral circuitry 76 includes circuits, such as a circuit that generates a clock signal regulating internal operations, a power supply circuit, and a reset circuit. The controller 70 controls the controlled variables by causing the CPU 72 to execute programs stored in the ROM 74.

Figure 2:
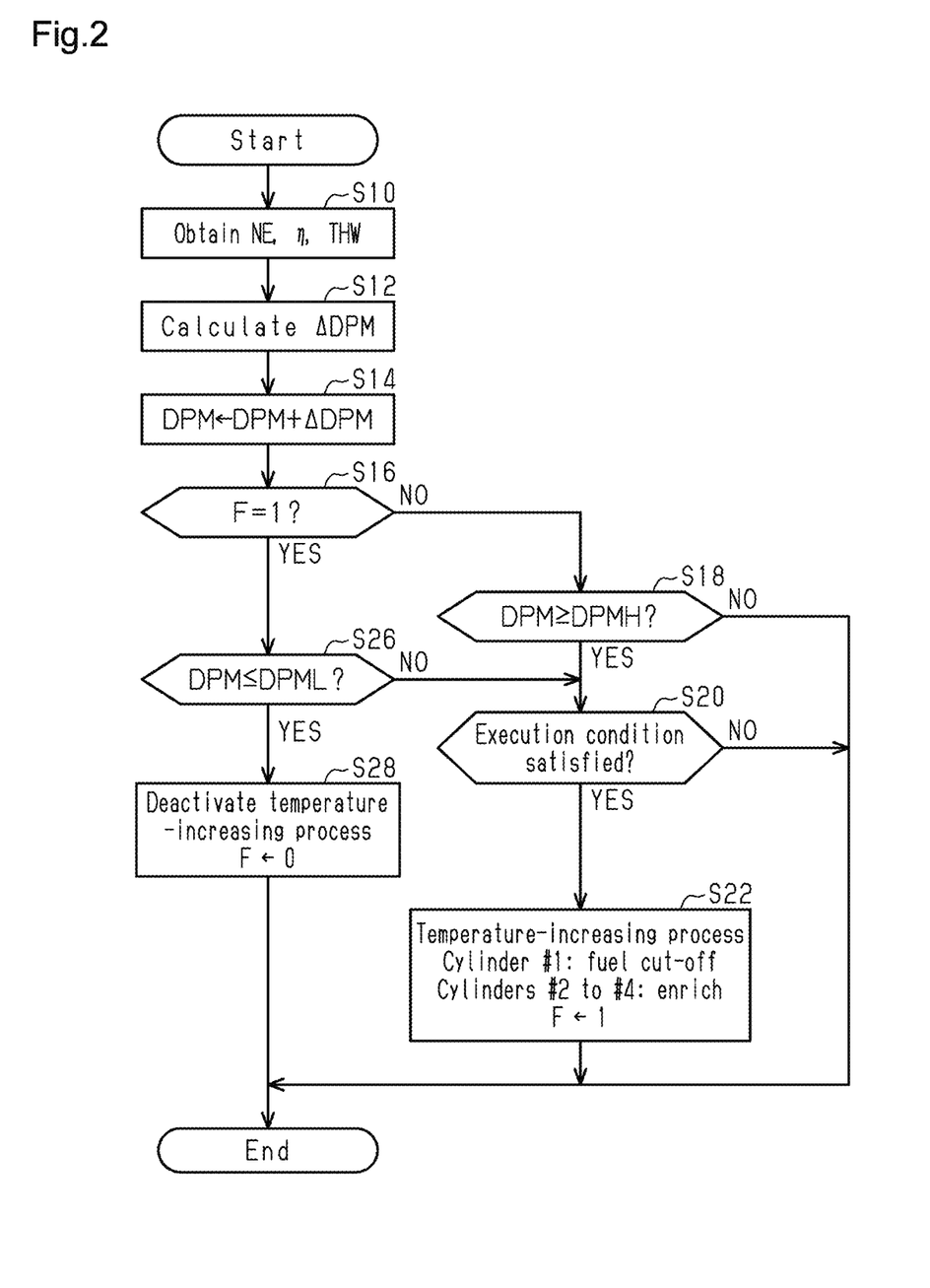
FIG. 2 is a flowchart showing a procedure related to the regenerating process executed by the controller of the embodiment.

FIG. 2 shows a procedure of processes executed by the controller 70 of the present embodiment. The processes shown in FIG. 2 are executed by the CPU 72 repeatedly executing programs stored in the ROM 74, for example, in a specific cycle. In the following description, the number of each step is represented by the letter S followed by a numeral.

In the series of processes shown in FIG. 2, the CPU 72 first obtains an engine rotation speed NE, a charging efficiency η, and the water temperature THW (S10). The engine rotation speed NE is calculated by the CPU 72 in reference to the output signal Scr. The charging efficiency η is calculated by the CPU 72 in reference to the intake air amount Ga and the engine rotation speed NE.

Next, the CPU 72 uses the engine rotation speed NE, the charging efficiency and the water temperature THW to calculate an update amount ΔDPM of a deposition amount DPM (S12). The deposition amount DPM is the amount of PM trapped by the GPF 34. More specifically, the CPU 72 uses the engine rotation speed NE, the charging efficiency and the water temperature THW to calculate the amount of PM in the exhaust gas discharged to the exhaust passage 30. Further, the CPU 72 uses the engine rotation speed NE and the charging efficiency η to calculate the temperature of the GPF 34. The CPU 72 uses the amount of PM in exhaust gas and/or the temperature of the GPF 34 to calculate the update amount ΔDPM.

Then, the CPU 72 updates the deposition amount DPM in correspondence with the update amount ΔDPM (S14).

Subsequently, the CPU 72 determines whether a flag F is 1 (S16). When the flag F is 1, the flag F indicates that the temperature-increasing process is being executed to burn and remove the PM in the GPF 34. When the flag F is 0, the flag F indicates that the temperature-increasing process is not being executed.

When determining that the flag F is 0 (S16: NO), the CPU 72 determines whether the deposition amount DPM is greater than or equal to a regeneration execution value DPMH (S18). The regeneration execution value DPMH is set to a value in which PM needs to be removed because the amount of PM trapped by the GPF 34 is large.

When determining that the deposition amount DPM is greater than or equal to the regeneration execution value DPMH (S18: YES), the CPU 72 determines whether the condition for executing the temperature-increasing process is satisfied (S20). The execution condition simply needs to be a condition in which the logical conjunction of the following conditions (A) and (B) is true. That is, the execution condition is that the conditions (A) and (B) are both satisfied.

Condition (A): An engine torque command value Te* (a command value of torque for the internal combustion engine 10) is greater than or equal to a specific value Teth.

Condition (B): The engine rotation speed NE of the internal combustion engine 10 is greater than or equal to a specific speed.

When determining that the condition for executing the temperature-increasing process is satisfied (S20: YES), the CPU 72 executes the temperature-increasing process and substitutes 1 to the flag F (S22). The CPU 72 executes a partial cylinder fuel cut-off process as the temperature-increasing process.

The partial cylinder fuel cut-off process deactivates the supply of fuel to one or some of the cylinders and supplies fuel to the remaining cylinders other than the cylinder(s) in which the supply of fuel has been deactivated. The partial cylinder fuel cut-off process includes a deactivating process and an increasing process.

The deactivating process deactivates the supply of fuel to cylinder #1 by deactivating the injection of fuel from the port injection valve 16 and the direct injection valve 22 of cylinder #1. The cylinder for which the deactivating process is executed is hereinafter referred to as the fuel cut-off cylinder. The remaining cylinders other than the fuel cut-off cylinder, that is, the cylinders to which fuel is supplied to burn air-fuel mixture are hereinafter referred to as the combustion cylinders. In the present embodiment, the deactivating process is executed one time in each combustion cycle.

The increasing process increases the amounts of air and fuel supplied to each of the combustion cylinders (i.e., cylinder #2, cylinder #3, and cylinder #4), as compared with when the deactivating process is not executed, in order to supply unburned fuel to the exhaust system and compensate for a decrease in the engine output caused by the deactivating process. When the increasing process is executed, the intake air amount of each combustion cylinder is increased by adjusting the open degree of the throttle valve 14. Additionally, when the increasing process is executed, the fuel injection amounts injected from the port injection valves 16 and/or the direct injection valves 22 are increased such that the air-fuel ratios of the air-fuel mixture in the combustion cylinders become richer than the stoichiometric air-fuel ratio.

In this partial cylinder fuel cut-off process, oxygen and unburned fuel are discharged to the exhaust passage 30 to increase the temperature of the GPF 34 so that the PM trapped by the GPF 34 is burned and removed. That is, this process causes oxygen and unburned fuel to be discharged to the exhaust passage 30 so as to burn the unburned fuel and thus increase the temperature of exhaust gas in the three-way catalyst 32, thereby increasing the temperature of the GPF 34. Additionally, the supply of oxygen into the GPF 34 allows the PM trapped by the GPF 34 to be burned and removed.

When determining that the flag F is 1 in the process of S16 (S16: YES), the CPU 72 determines whether the deposition amount DPM is less than or equal to a deactivation threshold value DPML (S26). The deactivation threshold value DPML is set to a value in which the temperature-increasing process is allowed to be deactivated because the amount of PM trapped by the GPF 34 is sufficiently small. When determining that the deposition amount DPM is less than or equal to the deactivation threshold value DPML (S26: YES), the CPU 72 deactivates the partial cylinder fuel cut-off process so as to deactivate the temperature-increasing process, thereby substituting 0 into the flag F (S28).

When completing the process of S22, S28 or when making a negative determination in the process of S18, S20, the CPU 72 temporarily ends the series of processes shown in FIG. 2.

Figure 3:
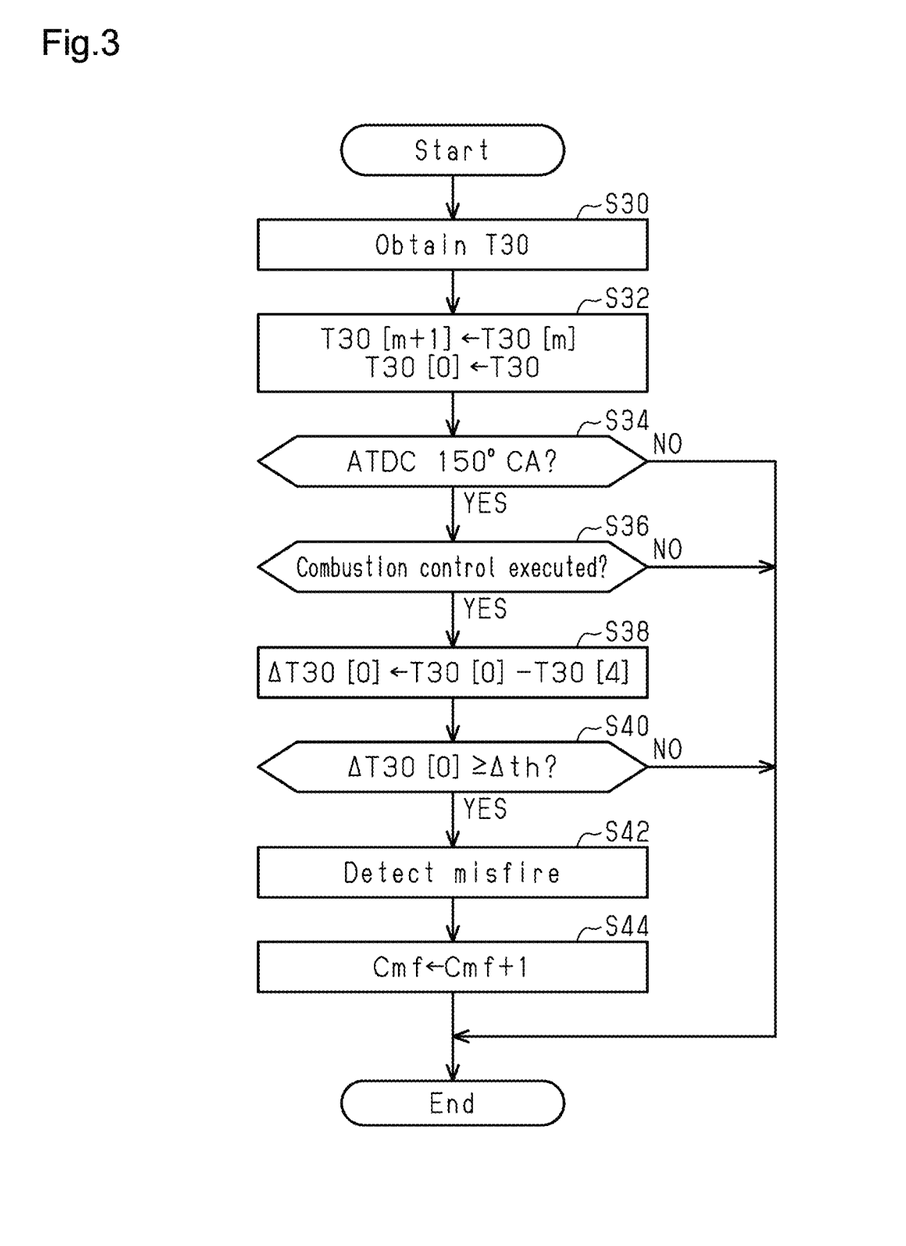
FIG. 3 is a flowchart showing a procedure related to the misfire detecting process executed by the controller of the embodiment.

FIG. 3 shows a procedure of the misfire detecting process executed by the controller 70. The processes shown in FIG. 3 are executed by the CPU 72 repeatedly executing programs stored in the ROM 74, for example, in a specific cycle.

In the series of processes shown in FIG. 3, the CPU 72 first obtains a time T30 for the crankshaft 26 to rotate by 30° CA (S30). The time T30 is calculated by the CPU 72 counting the time for the crankshaft 26 to rotate by 30° CA in reference to the output signal Scr.

Next, the CPU 72 substitutes the time T30[$m$] into the time T30[$m+1$], where m=0, 1, 2, 3, . . . , and substitutes, into the time T30[0], the time T30 that was newly obtained in the process of S30 and stores these times T30 in the memory device 75 (S32). The process of S32 is performed such that the variable in the parenthesis subsequent to the time T30 becomes larger the further back in time it represents. In a case where the value of the variable in the parenthesis is increased by one, the time T30 is counted at the previous 30° CA.

Subsequently, the CPU 72 determines whether the current rotation angle of the crankshaft 26 is after top dead center (ATDC) 150° CA with reference to the top dead center of one of cylinders #1 to #4 (S34).

When determining that the current rotation angle of the crankshaft 26 is ATDC 150° CA with reference to the top dead center of one of cylinders #1 to #4 (S34: YES), the CPU 72 determines whether combustion control has been executed in the cylinder of which the rotation angle is determined as ATDC 150° CA, that is, it determines whether fuel injection and ignition have been executed in order to burn air-fuel mixture (S36). In other words, the CPU 72 determines whether the cylinder subject to the determination is a cylinder in which combustion control has been deactivated by the regenerating process, that is, it determines whether that cylinder is the fuel cut-off cylinder.

When determining that the combustion control is determined as having been executed (S36: YES), the CPU 72 subjects the cylinder to determination of whether a misfire has occurred, and calculates a rotation fluctuation amount ΔT30[0] of the cylinder subject to the determination (S38). More specifically, the CPU 72 subtracts the time T30[4] from the latest time T30[0]. In this context, T30[4] is the time required for the rotation by 30° CA from TDC of the cylinder subject to the determination. Accordingly, in a case where a misfire has not occurred, the time T30[0] is smaller than the time T30[4] and thus the rotation fluctuation amount ΔT30[0] is negative. In a case where a misfire has occurred, the rotation fluctuation amount ΔT30[0] is positive.

Next, the CPU 72 determines whether the rotation fluctuation amount ΔT30[0] is greater than or equal to a fluctuation amount threshold value Δth (S40). This process determines whether a misfire has occurred in the cylinder subject to the determination. For example, the CPU 72 may variably set the fluctuation amount threshold value Δth in correspondence with the engine rotation speed NE and the charging efficiency η. The parameter that defines the fluctuation amount threshold value Δth is not limited to the variable indicating load, such as the charging efficiency η, and the engine rotation speed NE. The parameter that defines the fluctuation amount threshold value Δth may be, for example, the sum of the previous rotation fluctuation amount ΔT30 and a specific value. The previous rotation fluctuation amount ΔT30 is an amount in a cylinder in which the point in time when the compression top dead center occurs is back in time by an integral multiple of 360° and in which combustion control is not deactivated. The specific value in this case may also be variably set in correspondence with the load indicating load and/or the engine rotation speed NE.

When determining that the rotation fluctuation amount ΔT30 is greater than or equal to the fluctuation amount threshold value Δth (S40: YES), the CPU 72 determines that a misfire has occurred and detects the misfire (S42). Then, the CPU 72 increments a misfire counter Cmf (S44).

When completing the process of S44 or making a negative determination in the process of S34, S36, S40, the CPU 72 temporarily ends the series of processes shown in FIG. 3.

Figure 4:
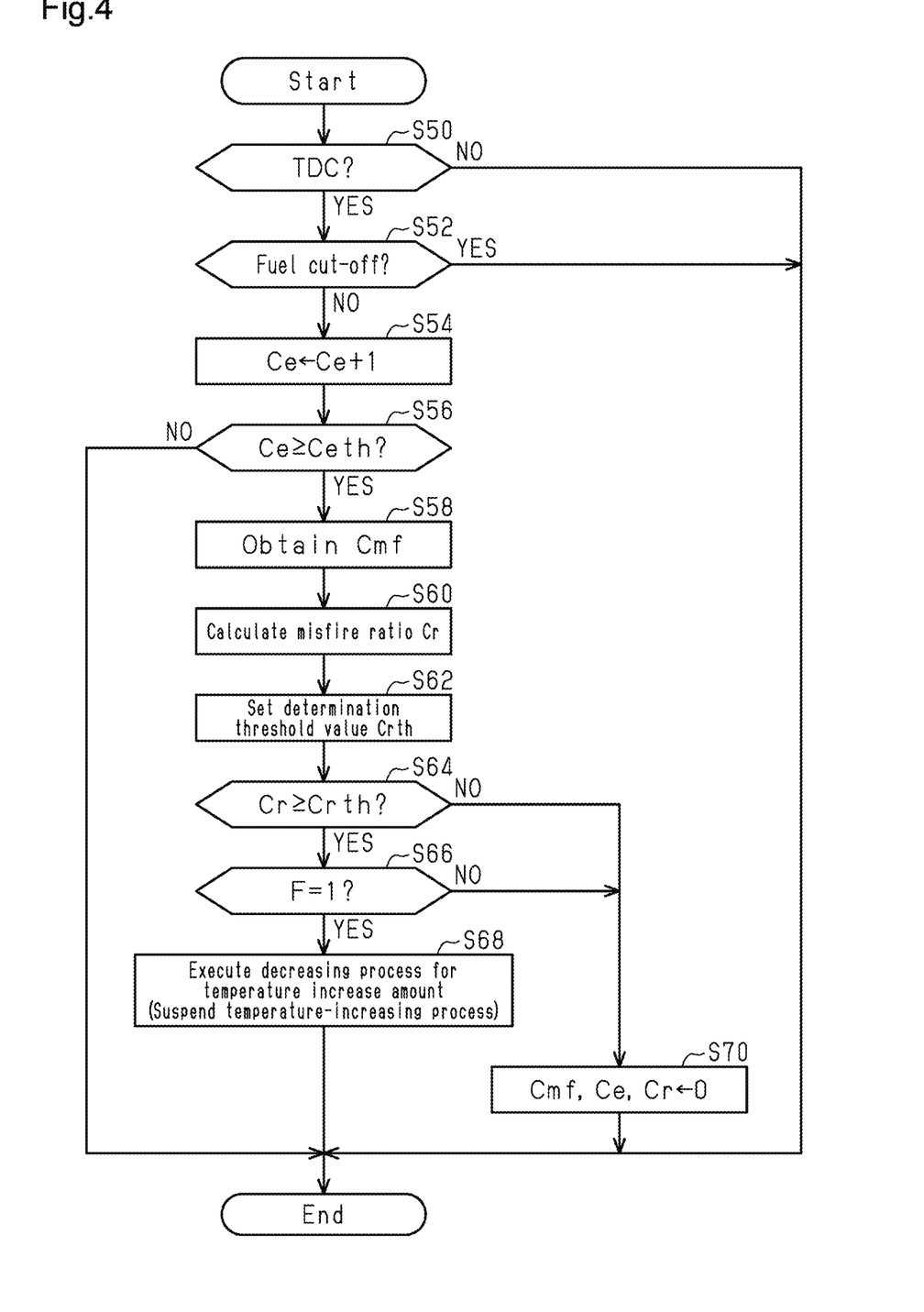
FIG. 4 is a flowchart showing a procedure related to the processes executed by the controller of the embodiment.

FIG. 4 shows a procedure of the misfire ratio calculating process executed by the controller 70. The processes shown in FIG. 4 are executed by the CPU 72 repeatedly executing programs stored in the ROM 74, for example, in a specific cycle.

In the series of processes shown in FIG. 4, the CPU 72 first determines whether one of cylinders #1 to #4 has reached its compression top dead center (S50). When determining that one of cylinders #1 to #4 has reached its compression top dead center (S50: YES), the CPU 72 determines whether the combustion control has been deactivated by the regenerating process in that cylinder (S52). In other words, the CPU 72 determines whether a fuel cut-off process has been executed in that cylinder. That is, the CPU 72 determines whether the deactivating process for combustion control has been executed. When determining that the combustion control has been executed (S52: NO), the CPU 72 increments a validity counter Ce (S54). The value of the validity counter Ce indicates the number of times fuel injection has been executed, that is, the number of times fuel injection and ignition have been executed such that air-fuel mixture is burned in the cylinder. Then, the CPU 72 determines whether the validity counter Ce is greater than or equal to a given value Ceth (S56).

When determining that the validity counter Ce is greater than or equal to the given value Ceth (S56: YES), the CPU 72 obtains the current misfire counter Cmf (S58).

Next, the CPU 72 calculates a misfire ratio Cr (S60). The misfire ratio Cr is a value indicating the proportion of the number of misfires detected by the misfire detecting process in the number of times combustion control has been executed in each cylinder. In the present embodiment, the misfire ratio Cr is a value obtained by dividing the misfire counter Cmf, obtained in S58, by the value of the validity counter Ce at the point in time when an affirmative determination was made in S56 (Cr=Cmf/Ce).

Subsequently, the CPU 72 sets a determination threshold value Crth (S62).

The determination threshold value Crth is used to determine whether the temperature of the three-way catalyst 32 is excessively increased by the occurrence of a misfire during the execution of the temperature-increasing process. For the determination threshold value Crth, the engine rotation speed NE and the charging efficiency η, which indicates load on the internal combustion engine 10, are used to set the minimum value of the misfire ratio that potentially causes the temperature of the three-way catalyst 32 to be increased by the occurrence of a misfire. As the engine rotation speed NE increases or as the value of the charging efficiency η increases, the temperature of exhaust gas increases and thus the temperature of the three-way catalyst 32 tends to increase excessively. Thus, in the present embodiment, as the engine rotation speed NE increases or as the value of the charging efficiency η increases, the determination threshold value Crth is changed so as to be decreased. More simply, the determination threshold value Crth may be a fixed value.

After setting the determination threshold value Crth in such a manner, the CPU 72 determines whether the misfire ratio Cr obtained in S60 is greater than or equal to the determination threshold value Crth (S64). The determining process in S64 determines whether the number of misfires detected by the misfire detecting process in the number of times combustion control has been executed in each cylinder is greater than or equal to a given value Sth. The given value Sth may be set to a value greater than or equal to 1.

When determining that the misfire ratio Cr is greater than or equal to the determination threshold value Crth (S64: YES), the CPU 72 determines whether the current flag F is 1, that is, determines whether the temperature-increasing process is being executed (S66).

When determining that the current flag F is 1 (S66: YES), the CPU 72 executes a decreasing process that decreases the amount of temperature increase in the three-way catalyst 32 (S68). The CPU 72 executes a process that suspends the temperature-increasing process as the decreasing process. That is, the CPU 72 executes a process that suspends the execution of the partial cylinder fuel cut-off process. When the execution of the partial cylinder fuel cut-off process is suspended in such a manner, the deactivation of fuel supply to the fuel cut-off cylinder is suspended and fuel starts to be supplied to the fuel cut-off cylinder. When the fuel supply is started, the fuel injection amount is adjusted such that the air-fuel ratio of air-fuel mixture in the cylinder that has served as the fuel cut-off cylinder becomes a stoichiometric air-fuel ratio. Further, when the execution of the partial cylinder fuel cut-off process is suspended, increasing of the amounts of air and fuel supplied to the combustion cylinder is suspended. Then, the fuel injection amount is decreased such that the air-fuel ratio of air-fuel mixture in the combustion cylinder becomes the stoichiometric air-fuel ratio or becomes slightly lean.

When determining that the misfire counter Cmf is less than the determination threshold value Crth in the process of S64 (S64: NO) or determining that the flag F is not 1 in the process of S66 (S66: NO), the CPU 72 initializes the misfire counter Cmf, the validity counter Ce, and the misfire ratio Cr (S70).

When completing the process of S68, S70, when making a negative determination in the process of S50, S56, or when making an affirmative determination in the process of S52, the CPU 72 temporarily ends the series of processes shown in FIG. 4.

The operation and advantages of the present embodiment will now be described.

(1) When the misfire ratio Cr is greater than or equal to the determination threshold value Crth (S64: YES in FIG. 4) and the number of misfires is greater than or equal to the given value, the amount of temperature increase in the three-way catalyst 32 is decreased by executing the above-described decreasing process (S68 in FIG. 4). This prevents the temperature of the three-way catalyst 32 from being excessively increased during the occurrence of a misfire.

(2) The process that suspends the temperature-increasing process is executed as the decreasing process. The process that suspends the temperature-increasing process is a process that suspends the deactivation of fuel supply to the fuel cut-off cylinder and starts supplying fuel to the fuel cut-off cylinder. When fuel starts to be supplied to the fuel cut-off cylinder in which the fuel supply has been deactivated in such a manner, the air-fuel mixture starts to be burned in that cylinder. This reduces the amount of air in the exhaust gas discharged from the cylinder. Accordingly, even if the amount of unburned fuel supplied to the three-way catalyst 32 is increased by the occurrence of a misfire, the amount of air supplied to the three-way catalyst 32 is reduced. This prevents the temperature of the three-way catalyst 32 from being excessively increased.

(3) The process that suspends the temperature-increasing process is executed as the decreasing process. The process that suspends the temperature-increasing process is a process that reduces the amount of fuel supplied to the combustion cylinder. Such a reduction in the amount of fuel supplied to the combustion cylinder reduces the amount of unburned fuel in the exhaust gas discharged from the combustion cylinder. Accordingly, even if the amount of unburned fuel supplied to the three-way catalyst 32 is increased by the occurrence of a misfire, the amount of unburned fuel supplied to the three-way catalyst 32 is reduced. This prevents the temperature of the three-way catalyst 32 from being excessively increased.

(4) When the deposition amount DPM becomes greater than or equal to a threshold value DPMth, the CPU 72 executes the temperature-increasing process. This allows the air drawn in the intake stroke of cylinder #1 to flow out to the exhaust passage 30 in the exhaust stroke of cylinder #1 without being burned. The air-fuel mixture of cylinders #2 to #4 is set to be richer than the stoichiometric air-fuel ratio Thus, the exhaust gas discharged from cylinders #2 to #4 to the exhaust passage 30 includes a vast amount of unburned fuel. The oxygen and unburned fuel discharged to the exhaust passage 30 increase the temperature of the GPF 34 by being burned in the three-way catalyst 32 or the like. The oxygen in the air that has flowed to the exhaust passage 30 oxidizes PM in the GPF 34. Thus, PM is burned and removed.

Second Embodiment

A second embodiment will now be described with reference to the drawings, focusing on the differences from the first embodiment.

Figure 5:
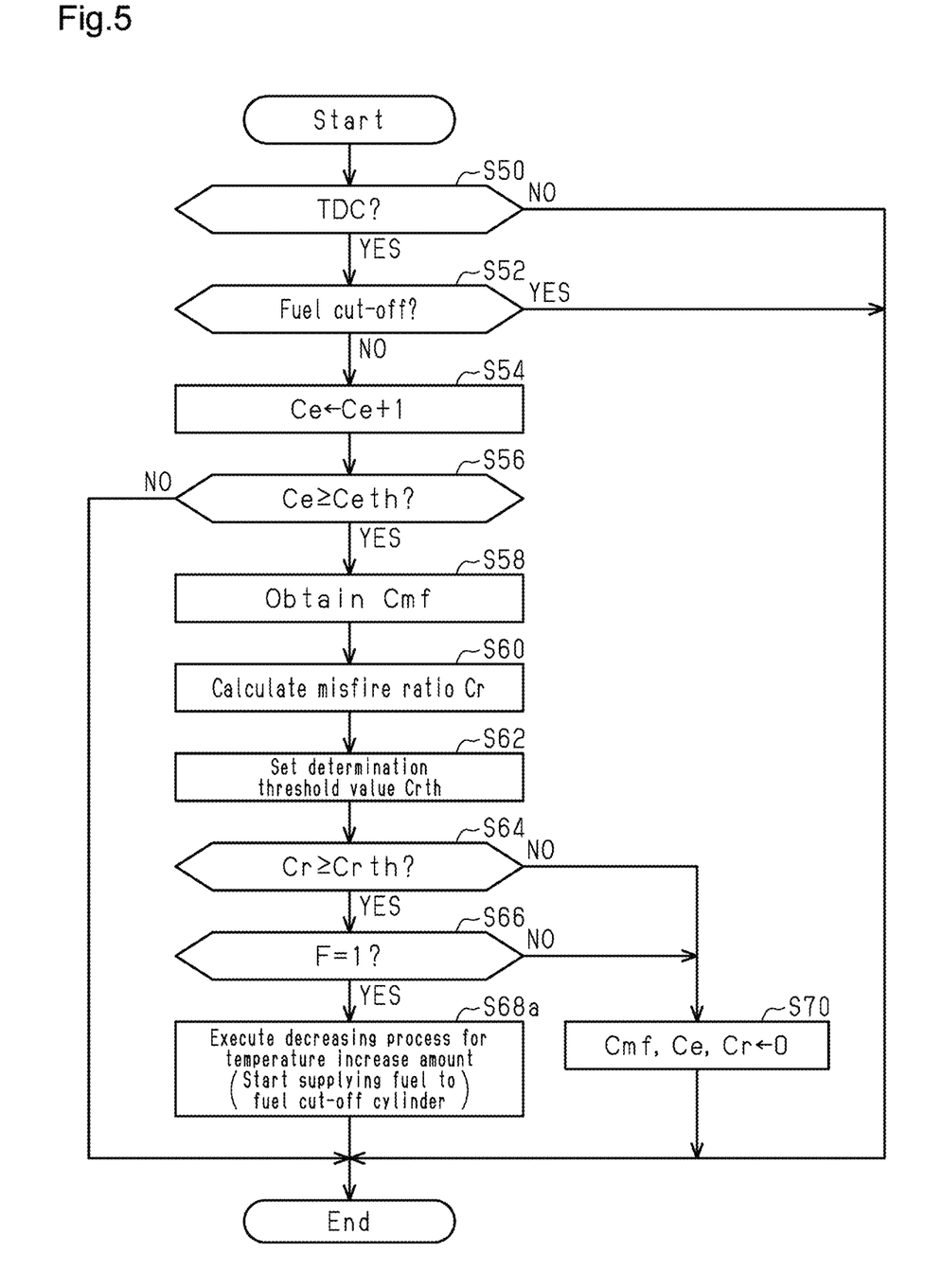
FIG. 5 is a flowchart showing a procedure related to the processes executed by the controller according to a second embodiment.

FIG. 5 shows a procedure of processes of the present embodiment. The processes shown in FIG. 5 are executed by the CPU 72 repeatedly executing programs stored in the ROM 74, for example, in a specific cycle. In FIG. 5, the same step numbers are given to the processes that correspond to those in FIG. 4.

In the series of processes shown in FIG. 5, the CPU 72 sequentially executes the processes from S50 to S66, which have been described above.

When determining that the flag F is 1 in the process of S66 (S66: YES), the CPU 72 executes the decreasing process that decreases the amount of temperature increase in the three-way catalyst 32 (S68a). The CPU 72 executes, as the decreasing process, a process that suspends the deactivation of fuel supply to the fuel cut-off cylinder and starts supplying fuel to the fuel cut-off cylinder. When the fuel supply is started, the fuel injection amount is adjusted such that the air-fuel ratio of air-fuel mixture in the cylinder that has served as the fuel cut-off cylinder becomes the stoichiometric air-fuel ratio.

When completing the process of S68a, S70, when making a negative determination in the process of S50, S56, or when making an affirmative determination in the process of S52, the CPU 72 temporarily ends the series of processes shown in FIG. 5.

In this manner, in the present embodiment, the CPU 72 executes, as the decreasing process in S68a, the process that suspends the deactivation of fuel supply to the fuel cut-off cylinder and starts supplying fuel to the fuel cut-off cylinder. Accordingly, even if a misfire occurs during the execution of the temperature-increasing process, the operation and advantages other than advantage (3) are obtained.

Third Embodiment

A third embodiment will now be described with reference to the drawings, focusing on the differences from the first embodiment.

Figure 6:
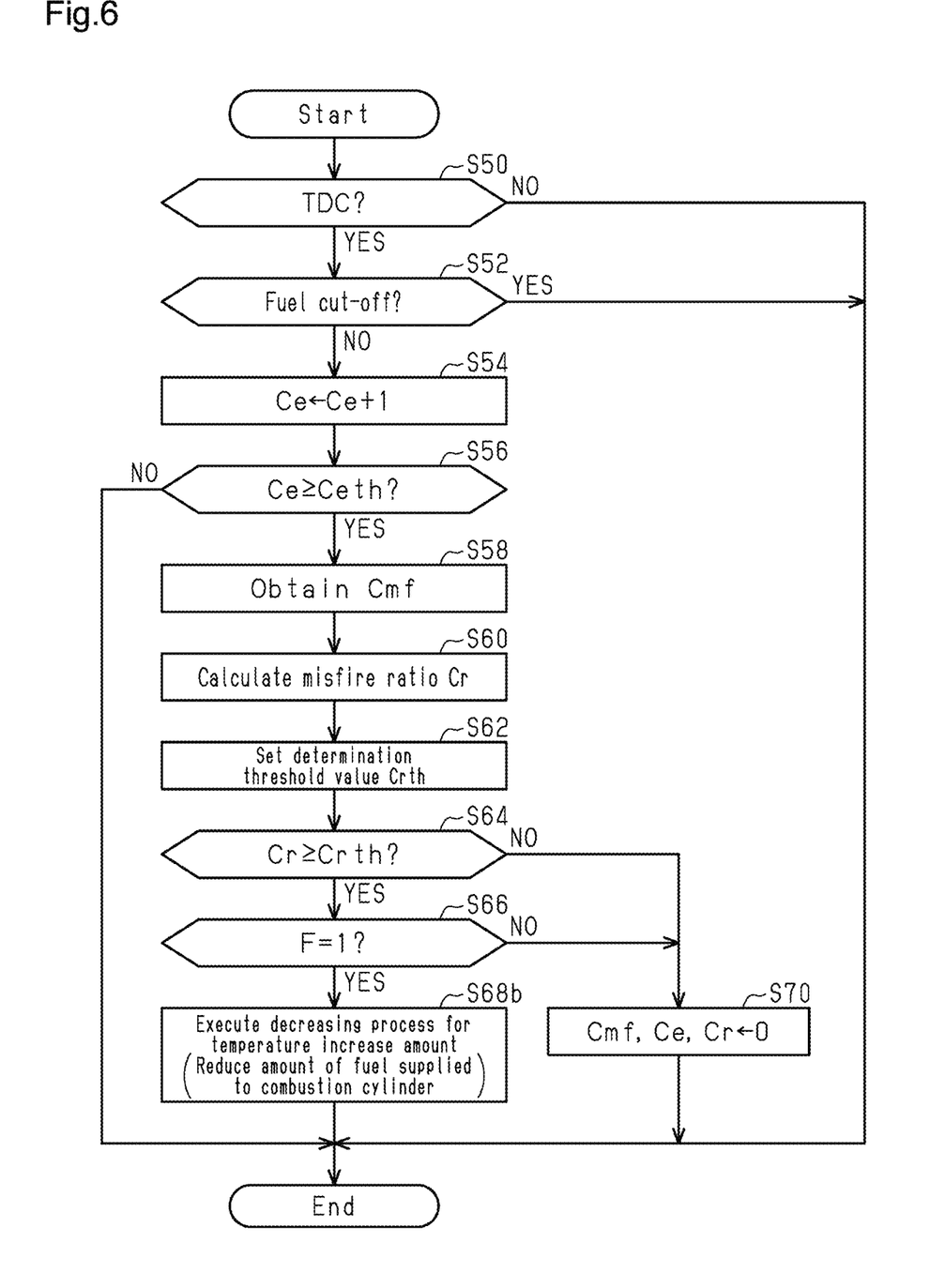
FIG. 6 is a flowchart showing a procedure related to the processes executed by the controller according to a third embodiment.

FIG. 6 shows a procedure of processes of the present embodiment. The processes shown in FIG. 6 are executed by the CPU 72 repeatedly executing programs stored in the ROM 74, for example, in a specific cycle. In FIG. 6, the same step numbers are given to the processes that correspond to those in FIG. 4.

In the series of processes shown in FIG. 6, the CPU 72 sequentially executes the processes from S50 to S66, which have been described above.

When determining that the flag F is 1 in the process of S66 (S66: YES), the CPU 72 executes the decreasing process that decreases the amount of temperature increase in the three-way catalyst 32 (S68b). The CPU 72 executes, as the decreasing process, a process that reduces the amount of fuel supplied to the combustion cylinder. That is, the CPU 72 executes a process that suspends increasing of the amounts of air and fuel supplied to the combustion cylinder and then decreases the fuel injection amount such that the air-fuel ratio of air-fuel mixture in the combustion cylinder becomes the stoichiometric air-fuel ratio or becomes slightly lean.

When completing the process of S68b, S70, when making a negative determination in the process of S50, S56, or when making an affirmative determination in the process of S52, the CPU 72 temporarily ends the series of processes shown in FIG. 6.

In this manner, in the present embodiment, the CPU 72 executes, as the decreasing process in S68b, the process that reduces the amount of fuel supplied to the combustion cylinder. Accordingly, even if a misfire occurs during the execution of the temperature-increasing process, the operation and advantages other than advantage (2) are obtained.

Fourth Embodiment

A fourth embodiment will now be described with reference to the drawings, focusing on the differences from the first embodiment.

Figure 7:
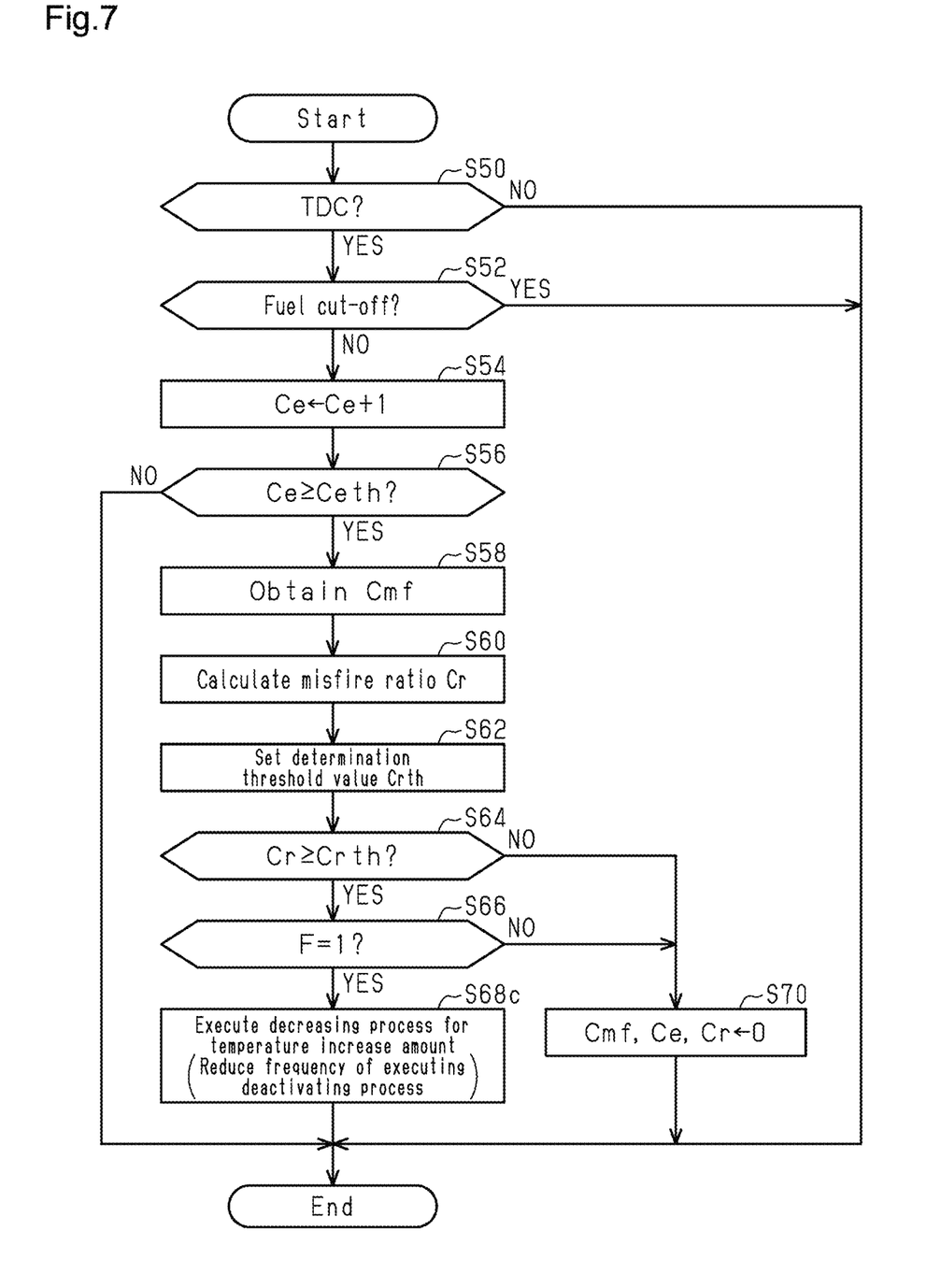
FIG. 7 is a flowchart showing a procedure related to the processes executed by the controller according to a fourth embodiment.

FIG. 7 shows a procedure of processes of the present embodiment. The processes shown in FIG. 7 are executed by the CPU 72 repeatedly executing programs stored in the ROM 74, for example, in a specific cycle. In FIG. 7, the same step numbers are given to the processes that correspond to those in FIG. 4.

In the series of processes shown in FIG. 7, the CPU 72 sequentially executes the processes from S50 to S66, which have been described above.

When determining that the flag F is 1 in the process of S66 (S66: YES), the CPU 72 executes the decreasing process that decreases the amount of temperature increase in the three-way catalyst 32 (S68c). The CPU 72 executes, as the decreasing process, a process that reduces the frequency of executing the deactivating process. That is, the CPU 72 executes a process that reduces the number of cylinders in which the supply of fuel is deactivated in a specific period when the temperature-increasing process is executed. For example, in the present embodiment, a process is executed to change, from each combustion cycle to each two combustion cycles, a repetition cycle of the combustion cycle in which the deactivating process is executed one time. The changed repetition cycle may be a cycle other than each two combustion cycles.

When completing the process of S68c, S70, when making a negative determination in the process of S50, S56, or when making an affirmative determination in the process of S52, the CPU 72 temporarily ends the series of processes shown in FIG. 7.

In this manner, in the present embodiment, the CPU 72 executes, as the decreasing process in S68c, a process that reduces the number of cylinders in which the supply of fuel is deactivated in the specific period when the temperature-increasing process is executed. This reduces the amount of air supplied to the three-way catalyst 32 in the specific period. Accordingly, even if the amount of unburned fuel supplied to the three-way catalyst 32 is increased by the occurrence of a misfire, the amount of air supplied to the three-way catalyst 32 is reduced. This prevents the temperature of the three-way catalyst 32 from being excessively increased. Therefore, the present embodiment provides the operation and advantages that are similar to those of the second embodiment.

The above-described embodiments may be modified as follows. The above-described embodiment and the following modifications may be implemented in combination with each other as long as technical contradiction does not occur.

The decreasing process suspends the deactivation of fuel supply to the fuel cut-off cylinder and starts supplying fuel to the fuel cut-off cylinder in order to decrease the amount of air supplied to the three-way catalyst 32. The amount of air supplied to the three-way catalyst 32 may be decreased using another method. The following (A) and (B) are such examples.

(A) When the decreasing process is executed to start supplying fuel to the fuel cut-off cylinder, the amount of fuel supplied to the cylinder that has served as the fuel cut-off cylinder may be adjusted such that the air-fuel ratio of air-fuel mixture in that cylinder becomes lean. In this case, as compared with when the air-fuel ratio of air-fuel mixture in the fuel cut-off cylinder in which fuel starts to be supplied, the amount of air in the exhaust gas discharged from the fuel cut-off cylinder becomes larger. Thus, the effect of increasing the temperature of the three-way catalyst 32 is gained to a certain extent. This increases the temperature of the three-way catalyst 32 while preventing the temperature of the three-way catalyst 32 from being excessively increased. In this modification, it is desired that the decreasing process is executed such that the amount of temperature increase in the three-way catalyst 32 decreases as the amount of unburned fuel supplied to the three-way catalyst 32 increases. For example, the amount of air supplied to the three-way catalyst 32 may be reduced by reducing the leanness of the air-fuel ratio as the difference between the misfire ratio Cr and the determination threshold value Crth increases.

(B) The intake air amount may be reduced by reducing the open degree of the throttle valve. For example, this is achieved by reducing the requested output Pe* of the internal combustion engine 10 or reducing an upper limit guard value of the requested output Pe*. Such a decrease of the requested output Pe* may be compensated for by the outputs of the above-described motor generators.

In the decreasing process, in order to decrease the amount of fuel supplied to the combustion cylinder, the fuel injection amount is reduced such that the air-fuel ratio of air-fuel mixture in the combustion cylinder becomes the stoichiometric air-fuel ratio or slightly lean. The fuel injection amount may be decreased using other methods. The following (C) to (E) are such examples.

(C) When the decreasing process is executed, the leanness during the execution of the temperature-increasing process may be reduced such that the air-fuel ratio of air-fuel mixture becomes rich while decreasing the amount of fuel supplied to the combustion cylinder. In this modification, it is also desired that the decreasing process is executed such that the amount of temperature increase in the three-way catalyst 32 decreases as the amount of unburned fuel supplied to the three-way catalyst 32 increases. For example, the amount of unburned fuel supplied to the three-way catalyst 32 may be reduced by reducing the richness of the air-fuel ratio as the difference between the misfire ratio Cr and the determination threshold value Crth increases.

(D) The fuel injection amount may be decreased by reducing the open degree of the throttle valve and reducing the intake air amount. This is achieved by, for example, reducing the requested output Pe* of the internal combustion engine 10 or reducing the upper limit guard value of the requested output Pe*. Such a decrease in the requested output Pe* may be compensated for by the outputs of the above-described motor generators.

(E) When the above-described increasing processes such as the start-time amount increase, the warm-up amount increase, and the reactivation amount increase are executed, these increase values may be reduced. As the time elapses and/or the engine temperature increases, these increase amounts gradually attenuate. Such an attenuation speed may be increased.

The excessive increase in temperature of the three-way catalyst 32 caused by an increase in the amount of unburned fuel may also result from a factor other than a misfire, such as a low temperature of the internal combustion engine 10. Thus, the controller 70 may execute the following processes in order to prevent the temperature of the three-way catalyst 32 from being increased when the engine has a low temperature.

Figure 8:
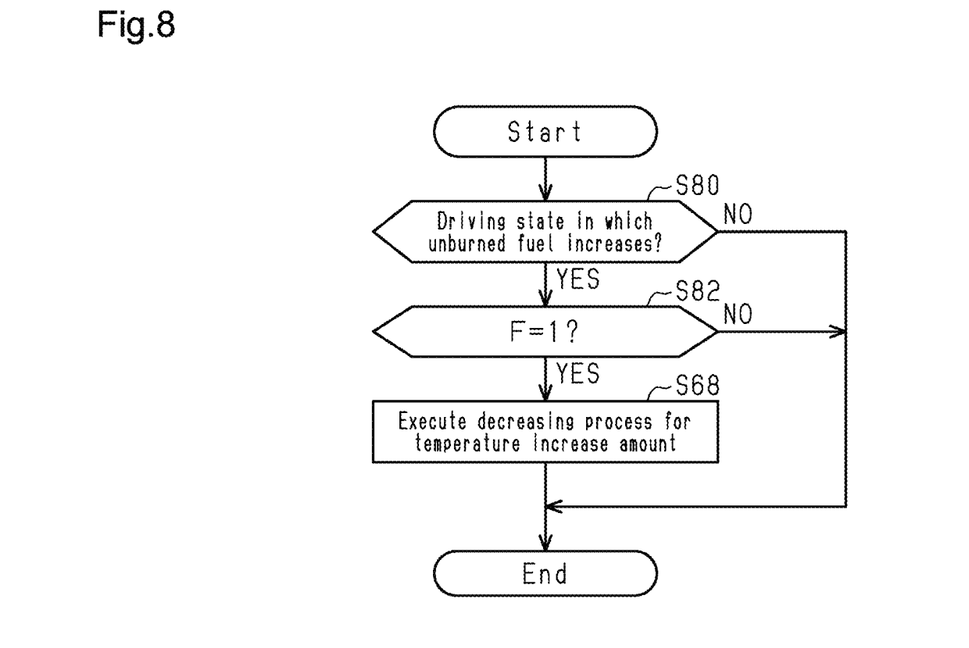
FIG. 8 is a flowchart showing a procedure related to the processes executed by the controller according to another embodiment.

FIG. 8 shows a procedure of processes executed by the controller 70. The processes shown in FIG. 8 are executed by the CPU 72 repeatedly executing programs stored in the ROM 74, for example, in a specific cycle. In FIG. 8, the same step numbers are given to the processes that correspond to those in FIG. 4.

In the series of processes shown in FIG. 8, the CPU 72 first determines whether the internal combustion engine 10 is in a driving state in which the amount of unburned fuel increases (S80). In S80, when one of the following exemplary conditions (a) to (f) is satisfied, the CPU 72 determines that the internal combustion engine 10 is in the driving state in which the amount of unburned fuel increases.

(a) The coolant temperature of the internal combustion engine 10 detected by a sensor is less than or equal to a given value.

(b) The oil temperature of the internal combustion engine 10 detected by a sensor is less than or equal to a given value.

(c) The time elapsed after the engine is started is less than or equal to a given value.

(d) The recent engine deactivation time is greater than or equal to a given value.

(e) The time elapsed since the reactivation from fuel cut-off is less than or equal to a given value.

(f) The recent fuel cut-off execution time is greater than or equal to a given value.

These given values are adapted values that are set in order to determine that the internal combustion engine 10 is in the driving state in which the amount of unburned fuel increases.

When determining that the internal combustion engine 10 is in the driving state in which the amount of unburned fuel increases (S80: YES), the CPU 72 determines whether the flag F is 1, that is, determines whether the temperature-increasing process is being executed (S82). When determining that the flag F is 1 (S82: YES), the CPU 72 executes the above-described process of S68 (i.e., the above-described decreasing process) and temporarily ends the process. The process of S68a, process of S68b, and/or process of S68c described above as the decreasing process may be executed.

When making a negative determination in the process of S80 or S82, the CPU 72 temporarily ends the series of processes shown in FIG. 8.

Such a modification prevents the temperature of the three-way catalyst 32 from being excessively increased when the temperature of the engine is low.

When a misfire is occurring and/or when the temperature of the engine is low, an increase in the amount of unburned fuel causes the air-fuel ratio AFf to become richer than the stoichiometric air-fuel ratio. Thus, the controller 70 may execute the following process in order to prevent the temperature of the three-way catalyst 32 from being increased by an increase in the amount of unburned fuel.

Figure 9:
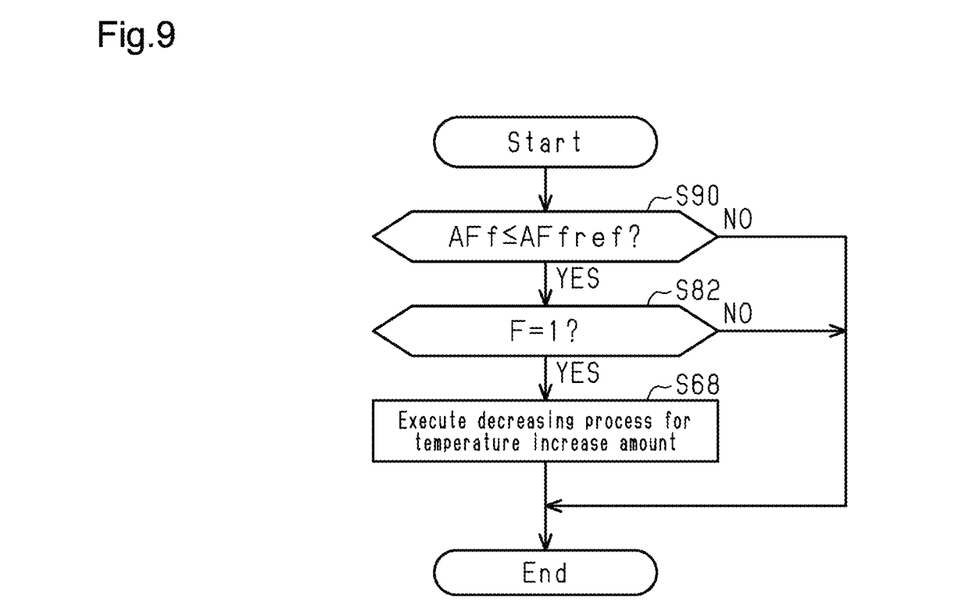
FIG. 9 is a flowchart showing a procedure related to the processes executed by the controller according to a further embodiment.

FIG. 9 shows a procedure of processes executed by the controller 70. The processes shown in FIG. 9 are executed by the CPU 72 repeatedly executing programs stored in the ROM 74, for example, in a specific cycle. In FIG. 9, the same step numbers are given to the processes that correspond to those in FIG. 8.

In the series of processes shown in FIG. 9, the CPU 72 first determines whether the current air-fuel ratio AFf is less than or equal to a given value AFfref (S90). That is, the CPU 72 determines whether the current air-fuel ratio AFf is equal to the given value AFfref or is a richer value than the given value AFfref. The given value AFfref is a richer value than the stoichiometric air-fuel ratio. The given value AFfref is used to determine whether the temperature of the three-way catalyst 32 becomes excessively high when the temperature-increasing process is executed without executing the decreasing process. For example, the given value AFfref can be set to the air-fuel ratio AFf in a case where the three-way catalyst 32 is supplied with the amount of unburned fuel that is obtained by subtracting, from the minimum amount of the unburned fuel amount that potentially causes the temperature of the three-way catalyst 32 to become excessively high, the maximum amount of the unburned fuel amount supplied to the three-way catalyst 32 during the execution of the temperature-increasing process. When the air-fuel ratio AFf is less than or equal to the given value AFfref, the CPU 72 determines that the temperature of the three-way catalyst 32 potentially becomes excessively high when the temperature-increasing process is executed without executing the decreasing process.

When determining that the air-fuel ratio AFf is less than or equal to a given value AFfref (S90: YES), the CPU 72 next determines whether the flag F is 1, that is, determines whether the temperature-increasing process is being executed (S82). When determining that the flag F is 1 (S82: YES), the CPU 72 executes the above-described process of S68 (i.e., the above-described decreasing process) and temporarily ends the process. The process of S68a, process of S68b, and/or process of S68c described above as the decreasing process may be executed.

When making a negative determination in the process of S90 or S82, the CPU 72 temporarily ends the series of processes shown in FIG. 9.

Such a modification prevents the temperature of the three-way catalyst 32 from being excessively increased by an increase in the amount of unburned fuel.

The controller 70 may execute the following process in order to prevent the temperature of the three-way catalyst 32 from being increased.

Figure 10:
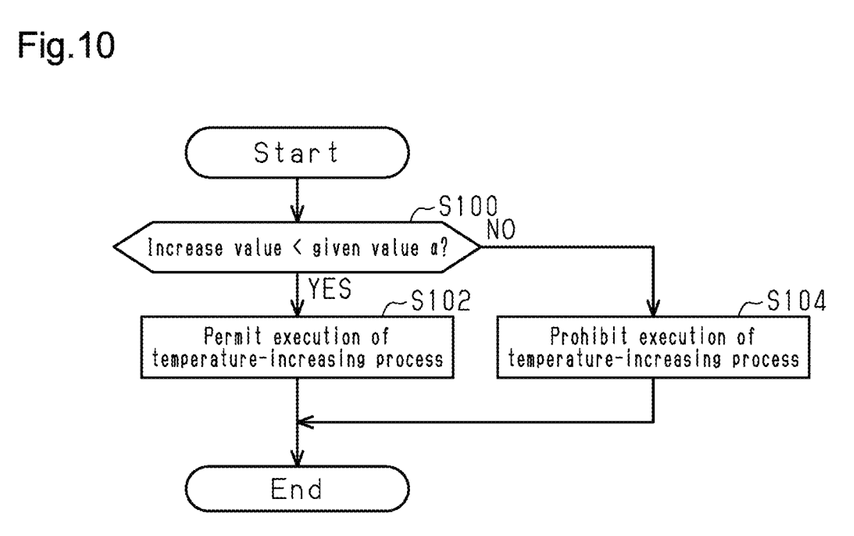
FIG. 10 is a flowchart showing a procedure related to the processes executed by the controller according to yet another embodiment.

FIG. 10 shows a procedure of processes executed by the controller 70. The processes shown in FIG. 10 are executed by the CPU 72 repeatedly executing programs stored in the ROM 74, for example, in a specific cycle.

In the series of processes shown in FIG. 10, the CPU 72 first determines whether the increase value is less than a given value α (S100). The increase value is the sum of the increase correction values of the fuel injection amount obtained by a process other than the temperature-increasing process. The increase value is, for example, the sum of various increase values of the start-time amount increase, the warm-up amount increase, the reactivation amount increase, and the like. The given value α is used to determine whether the temperature of the three-way catalyst 32 becomes excessively high when such various increase corrections and the temperature-increasing process are executed. For example, the given value α is set to a value obtained by subtracting, from the minimum amount of the unburned fuel amount that potentially causes the temperature of the three-way catalyst 32 to become excessively high, the maximum amount of the unburned fuel amount supplied to the three-way catalyst 32 during the execution of the temperature-increasing process.

When determining that the increase value is less than the given value α (S100: YES), the unburned fuel amount prevents the three-way catalyst 32 from being excessively increased even if the temperature-increasing process is executed. Thus, the CPU 72 permits the temperature-increasing process to be executed (S102) and then temporarily ends the process.

When determining that the increase value is greater than or equal to the given value α (S100: NO), the unburned fuel amount potentially exceeds an amount that causes the three-way catalyst 32 to be excessively increased if the temperature-increasing process is executed. Thus, the CPU 72 prohibits the temperature-increasing process from being executed (S104) and then temporarily ends the process.

Such a modification prevents the temperature of the three-way catalyst 32 from being excessively increased by an increase in the amount of unburned fuel. In this modification, if a state in which the execution of the temperature-increasing process is prohibited is changed to a state in which the execution of the temperature-increasing process is permitted, the amount of temperature increase by the temperature-increasing process may be gradually increased. This prevents the amounts of air and fuel supplied to the three-way catalyst 32 from being suddenly increased. Accordingly, the temperature of the three-way catalyst 32 is more properly prevented from being excessively increased.

Additionally, the process of S100 in this modification is changed to the process of S90. When a negative determination is made in the process of S90, the process of S102 may be executed. When an affirmative determination is made in the process of S90, the process of S104 may be executed. Even in this case, similar operation and advantages are gained.

In the misfire detecting process, the rotation fluctuation amount ΔT30 is set to the value obtained by subtracting, from the time T30[0] required for the rotation in the section between 120 ATDC and 150 ATDC, the time T30[4] required for the rotation in the section between TDC and 30 ATDC. Instead, for example, the rotation fluctuation amount ΔT30 may be set to a value obtained by subtracting, from the time T30 required for the rotation of a section between TDC and 30 ATDC of a cylinder subject to the determination of a misfire, the time T30 required for the rotation of a section between TDC and 30 ATDC of the cylinder that reached its compression top dead center lastly.

In the misfire detecting process, the rotation fluctuation amount, which is the fluctuation amount of the rotation speed of the crankshaft 26 in the rotation angle interval that is less than or equal to the occurrence interval of a compression top dead center, is quantified using the difference between the times required for the rotation of the rotation angle interval. Instead, the rotation fluctuation amount may be quantified using a ratio.

In the misfire detecting process, the rotation fluctuation amount, which is a fluctuation amount of the rotation speed, is quantified using time. Instead, the rotation fluctuation amount may be quantified using an angular velocity.

In the misfire detecting process, a misfire is detected from the fluctuation amount of the rotation speed of the crankshaft 26. Instead, for example, an in-cylinder pressure sensor that detects the pressure in the combustion chamber 20 may be provided. In this case, a misfire may be detected from the behavior of the detection value of the in-cylinder pressure sensor or may be detected from the behavior of the axial torque of the crankshaft 26 by calculating or detecting the axial torque.

In the misfire detecting process shown in FIG. 3, the process of S42 may be omitted. In this case, when an affirmative determination is made in S40, the process of S44 may be executed next.

The specific condition that permits the execution of the temperature-increasing process is not limited to the ones in the above-described embodiments. For example, only one of the two conditions (a) and (b) may be included. Alternatively, the specific condition may include a condition other than the above-described two conditions.

In order to compensate for a decrease in the engine output caused by the deactivating process, the increasing process increases the amounts of air and fuel supplied to the combustion chamber 20 when combustion control is executed for the air-fuel mixture in the remaining cylinders other than the fuel cut-off cylinder as compared with when the deactivating process is not executed. Instead, only the fuel amount may be increased by the increasing process when, for example, a decrease in the engine output caused by the deactivating process can be compensated for by the outputs of the above-described motor generators.

The process that executes the partial cylinder fuel cut-off process is not limited to the regenerating process. Instead, for example, a process may be executed to deactivate the supply of fuel in one or some of the cylinders in order to adjust the output of the internal combustion engine 10. Instead, when an anomaly occurs in one or some of the cylinders, a process may be executed to deactivate combustion control in the cylinder. Alternatively, when the oxygen absorption amount of the three-way catalyst 32 is less than or equal to a given value, a process may be executed to deactivate combustion control only in one or some of the cylinders and execute control that sets the air-fuel ratio of air-fuel mixture in the remaining cylinders to the stoichiometric air-fuel ratio.

The process that estimates the deposition amount DPM is not limited to the one illustrated in FIG. 2. Instead, for example, the deposition amount DPM may be estimated using the intake air amount Ga and the pressure difference between the upstream side and the downstream side of the GPF 34. More specifically, the deposition amount DPM simply needs to be estimated to be a larger value when the pressure difference is large than when the pressure difference is small. Even when the pressure difference is the same, the deposition amount DPM simply needs to be estimated to be a larger value when the intake air amount Ga is small than when the intake air amount Ga is large. If the pressure in the downstream side of the GPF 34 is regarded as a fixed value, the pressure Pex may be used instead of the pressure difference.

When the partial cylinder fuel cut-off process is executed, the number of cylinders in which combustion control is deactivated is one. The number of cylinders in which combustion control is deactivated may be changed. In this case, the maximum number is a value obtained by subtracting 1 from the number of cylinders of the internal combustion engine 10. Further, the cylinder in which combustion control is deactivated does not necessarily have to be fixed to a cylinder that has been defined in advance. For example, the cylinder in which combustion control is deactivated may be changed in each combustion cycle.

The GPF 34 is not limited to the filter supported by the three-way catalyst and may be only the filter. Further, the GPF 34 does not have to be located on the downstream side of the three-way catalyst 32 in the exhaust passage 30. Furthermore, the three-way catalyst 32 may be replaced with an oxidation catalyst that oxidizes components contained in exhaust gas. Additionally, the exhaust purifying apparatus does not necessarily have to include the GPF 34. For example, even if the exhaust purifying apparatus only includes the three-way catalyst 32, the processes illustrated in the above-described embodiments and the modifications can be executed when combustion control is deactivated in one or some of the cylinders so as to supply oxygen to the three-way catalyst 32 of which the oxygen absorption amount is less than or equal to a given value.

The controller 70 is not limited to a device that includes the CPU 72 and the ROM 74 and executes software processing. For example, at least part of the processes executed by the software in the above-described embodiments may be executed by hardware circuits dedicated to executing these processes (such as ASIC). That is, the controller 70 may be modified as long as it has any one of the following configurations (a) to (c): (a) a configuration including a processor that executes all of the above-described processes according to programs and a program storage device such as a ROM that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software execution devices each including a processor and a program storage device and a plurality of dedicated hardware circuits may be provided.

The vehicle is not limited to a series-parallel hybrid vehicle and may be, for example, a parallel hybrid vehicle or a series-parallel hybrid vehicle. The hybrid vehicle may be replaced with, for example, a vehicle in which only the internal combustion engine 10 is used as a power generation device for the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, the internal combustion engine including an exhaust passage and cylinders, the exhaust passage including a catalyst that purifies exhaust gas, wherein the controller is configured to execute:
    a temperature-increasing process that increases a temperature of the catalyst by deactivating fuel supply to one or some of the cylinders and supplying fuel to remaining ones of the cylinders other than the one or some of the cylinders;
    a misfire detecting process that detects a misfire;
    a determining process that determines whether a number of misfires detected by the misfire detecting process in a number of times combustion control has been executed in each of the cylinders is greater than or equal to a given value; and
    a decreasing process that decreases an amount of temperature increase in the catalyst when the number of misfires is greater than or equal to the given value as compared with when the number of misfires is less than the given value.

2. The controller according to claim 1, wherein the decreasing process includes suspending the deactivation of the fuel supply to the one or some of the cylinders and starting supplying fuel to the one or some of the cylinders.

3. The controller according to claim 2, wherein the decreasing process includes adjusting an amount of fuel supplied to the one or some of the cylinders where the fuel supply is started such that an air-fuel ratio of air-fuel mixture in the one or some of the cylinders becomes leaner than a stoichiometric air-fuel ratio.

4. The controller according to claim 1, wherein the decreasing process includes reducing a number of cylinders in which the fuel supply is deactivated in a specific period when the temperature-increasing process is executed.

5. The controller according to claim 1, wherein the decreasing process includes reducing amounts of fuel supplied to the remaining ones of the cylinders.

6. A method for controlling an internal combustion engine, the internal combustion engine including an exhaust passage and cylinders, the exhaust passage including a catalyst that purifies exhaust gas, the method comprising:
   increasing a temperature of the catalyst by deactivating fuel supply to one or some of the cylinders and supplying fuel to remaining ones of the cylinders other than the one or some of the cylinders;
   detecting a misfire;
   determining whether a number of detected misfires in a number of times combustion control has been executed in each of the cylinders is greater than or equal to a given value; and
   decreasing an amount of temperature increase in the catalyst when the number of misfires is greater than or equal to the given value as compared with when the number of misfires is less than the given value.

* * * * *